(No Model.)
W. J. DEVERS.
CAR BRAKE.
No. 508,872. Patented Nov. 14, 1893.
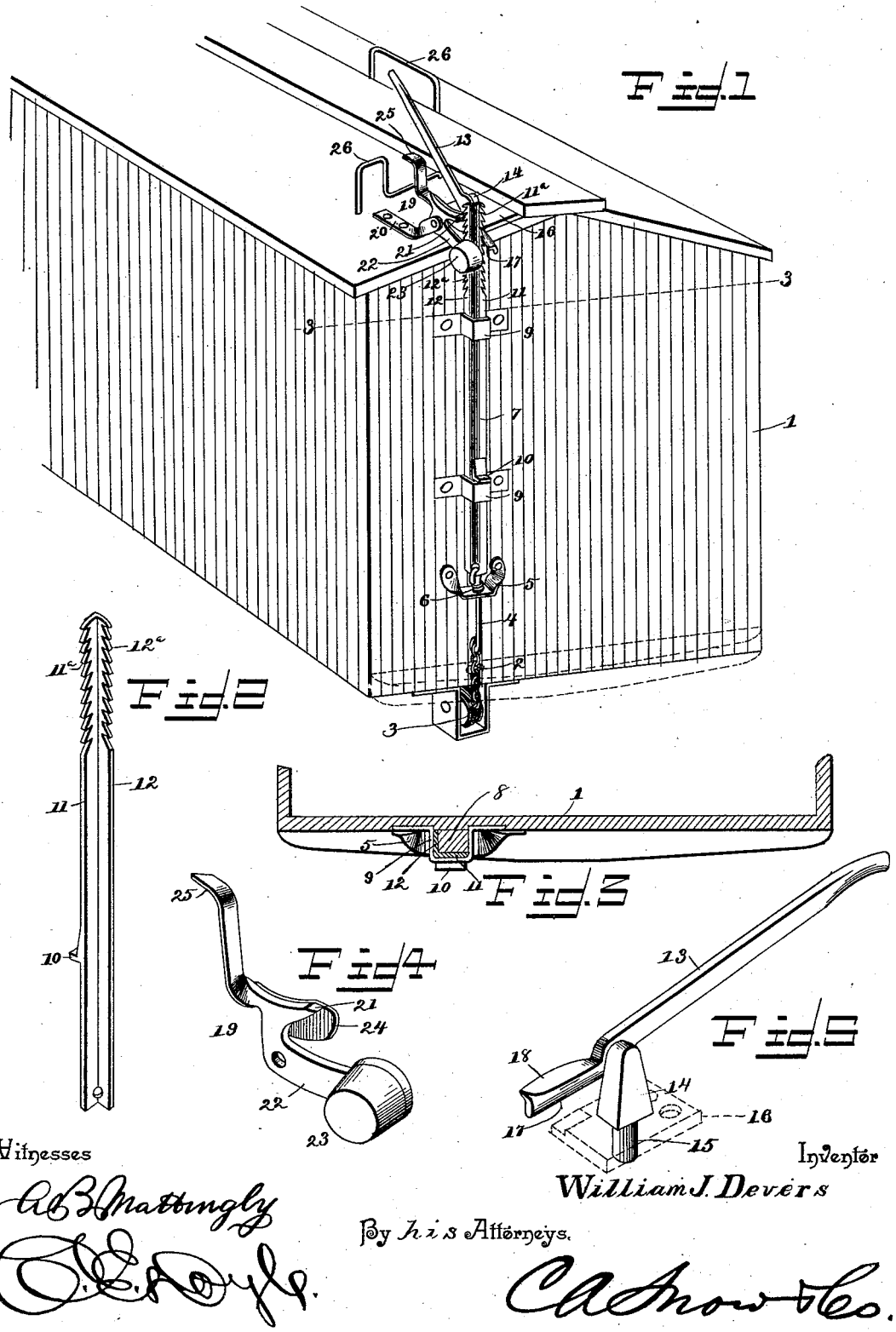
Witnesses
A. B. Mattingly
O. E. Doyle
Inventor
William J. Devers
By his Attorneys,
C. A. Snow & Co.

UNITED STATES PATENT OFFICE.

WILLIAM J. DEVERS, OF SCRANTON, PENNSYLVANIA, ASSIGNOR OF ONE-HALF TO ANTHONY P. O'DONNELL, OF SAME PLACE.

CAR-BRAKE.

SPECIFICATION forming part of Letters Patent No. 508,872, dated November 14, 1893.

Application filed April 18, 1893. Serial No. 470,875. (No model.)

*To all whom it may concern:*

Be it known that I, WILLIAM J. DEVERS, a citizen of the United States, residing at Scranton, in the county of Lackawanna and State of Pennsylvania, have invented a new and useful Car-Brake, of which the following is a specification.

My invention relates to operating devices for car-brakes, designed to be applied to cars of any form or structure, the objects in view being to provide means whereby a brakeman or train-hand can apply and release the brakes without endangering his life; and, furthermore, to provide such a brake-operating mechanism that the brakes may be applied with a minimum expenditure of power.

Further objects and advantages of my invention will appear in the following description, and the novel features thereof will be particularly pointed out in the appended claims.

In the drawings:—Figure 1 is a perspective view of a car equipped with my improved brake-operating mechanism. Fig. 2 is a detail view in perspective of the slide. Fig. 3 is a horizontal sectional view upon line 3—3 of Fig. 1. Fig. 4 is a detail view in perspective of the clutch device. Fig. 5 is a similar view of the operating lever.

Similar numerals of reference indicate corresponding parts in all the figures of the drawings.

1 represents a car body which, in the drawings, is illustrated as a box car, the same being equipped with the ordinary or any approved form of brake mechanism. As such mechanism forms no part of my invention I have not considered it necessary to illustrate it herein, it being understood that it is operated by the ordinary brake chain which is illustrated at 2, and after passing around a sheave 3 located at the lower front corner of the car body, rises vertically and is connected at its extremity to the lower end of a reciprocating link or rod 4. This link or rod operates slidably in a guide stirrup 5 which is secured to the end of the car body, and such link or rod carries a cushion spring 6 which is adapted, when the link is depressed, to rest upon the upper side of the stirrup and thus break the jar caused by the descent of the superposed parts hereinafter described.

7 represents a vertical slide which is angular in cross-section and is fitted over a stationary guide-bar 8, which is secured to the end of the car. Keepers 9 are secured to the ends of the car and extend over said slide thus holding it in slidable contact with the guide, and a projecting stop 10 is fixed to a convenient part of the slide to limit this vertical movement by contact with said keepers. The slide is connected at its lower end to the upper end of the link or rod. This angular slide consists of the integral wings or flanges 11 and 12, the former being disposed transversely to the length of the car and the latter being disposed parallel with the length of the car, and, therefore, bearing against the side of the guide. The flange or wing 11 is toothed at its free edge to form a rack $11^a$, and the flange or wing 12 is similarly toothed to form a rack $12^a$.

13 represents an operating lever which is mounted upon a swiveled standard 14, such standard being provided with a depending pintle 15 which fits rotatably in a socket formed in a bearing plate 16, which is secured to the roof of the car. This operating lever is provided with an engaging finger 17, having a beveled upper edge 18 to fit in the teeth of the rack $11^a$, whereby, by the oscillation and proper manipulation of the lever, the slide may be elevated to apply the brakes.

19 represents a pawl which is pivotally connected to a bracket 20 secured to the roof of the car adjacent to the slide, and a nose 21 of such pawl is adapted to engage the teeth of the rack $12^a$ to hold the slide in its adjusted position. The pawl is further provided with a forwardly extending arm 22 provided with a weight 23 to normally hold the nose, 21, in engagement with the rack. Fixed to the side of the nose 21 of the pawl is a guard-ear 24 which bears against the inner surface of the flange or wing 12 of the slide, and thus holds the pawl in operative relation to the rack.

It will be understood that, by reason of the operating lever being pivoted to the swiveled standard, it may be readily swung laterally in either direction to engage and disengage its finger with and from the rack, the slide being held after each partial elevation by means of the pawl.

To release the brakes it is simply necessary to disengage the pawl from the rack 12ª by drawing the handle 25 rearwardly.

A safety hold 26 is preferably attached to the roof of the car within reach of the brakeman while operating the brake mechanism.

It is well known that in operating the brakes by the ordinary means, as a winch of the common construction, the severing of the brake-chain is liable to precipitate the operator from the car. But, by the use of the mechanism which I have herein described, the brakes may be applied without unnecessary exertion upon the part of the operator, and such exertion is expended in a position which does not injure either life or limb, and the breaking of the chain cannot result in injury to the brakeman.

It will be understood that various changes in the form, proportion, and minor details of construction may be resorted to without departing from the spirit of my invention or sacrificing any of the advantages thereof.

It will be seen from the above description that by means of my improved operating mechanism a brake may be set in from three to five seconds owing to the power which may be applied through the lever, and, furthermore, that the brake may be released instantly thus avoiding all delay and adding materially to the effectiveness of the device.

Having described my invention, what I claim is—

1. The combination with a brake-chain, of an angular slide having angularly disposed flanges or wings provided with rack teeth, guiding devices for said slide, an operating lever to engage the rack teeth upon one of said flanges or wings, and a retaining pawl to engage the rack teeth of the other flange or wing, substantially as specified.

2. The combination with a brake-chain, of a slide connected to said chain and provided with rack teeth, a swiveled standard, an operating lever pivotally connected to said standard and provided with an arm to engage said rack, and a stop device to lock the slide in its adjusted positions, substantially as specified.

3. The combination with a brake-chain, of a stationary guide stirrup, a vertically reciprocable slide, a link connecting said brake-chain and slide and slidably mounted in said guide stirrup, a cushion spring carried by said link to engage the stirrup, and operating and retaining devices for the slide, substantially as specified.

4. The combination with a brake-chain, of a vertical guide, an angular slide mounted upon and conforming to said guide, guiding keepers embracing said slide, and operating and retaining devices for the slide, substantially as specified.

5. The combination with a brake-chain, of an angular slide connected to said brake-chain and having angularly-disposed flanges or wings provided with rack teeth, an operating lever adapted to engage one series of rack teeth, and a retaining pawl having a nose to engage the other series of rack teeth, a guiding ear to operate in contact with the surface of the flange or wing bearing said rack teeth, and a weight to normally hold the nose in engagement with said teeth, substantially as specified.

In testimony that I claim the foregoing as my own I have hereto affixed my signature in the presence of two witnesses.

WILLIAM J. DEVERS.

Witnesses:
  G. W. MILLER,
  MARY C. POWELL.